(12) United States Patent
Jeong

(10) Patent No.: US 10,308,153 B2
(45) Date of Patent: Jun. 4, 2019

(54) HEADREST MOVING DEVICE

(71) Applicant: Woobo Tech Co., Ltd., Pyeongtaek-si (KR)

(72) Inventor: Hae Il Jeong, Incheon (KR)

(73) Assignee: WOOBO TECH CO., LTD., Pyeongtaek-si, Gyeonggi-do (KR)

( * ) Notice: Subject to any disclaimer, the term of this patent is extended or adjusted under 35 U.S.C. 154(b) by 294 days.

(21) Appl. No.: 15/116,032

(22) PCT Filed: May 26, 2015

(86) PCT No.: PCT/KR2015/005248
§ 371 (c)(1),
(2) Date: Aug. 2, 2016

(87) PCT Pub. No.: WO2016/006822
PCT Pub. Date: Jan. 14, 2016

(65) Prior Publication Data
US 2017/0144573 A1  May 25, 2017

(30) Foreign Application Priority Data
Jul. 11, 2014  (KR) .................. 10-2014-0087410

(51) Int. Cl.
*A47C 7/38*  (2006.01)
*B60N 2/806*  (2018.01)
(Continued)

(52) U.S. Cl.
CPC ............... *B60N 2/841* (2018.02); *A47C 7/38* (2013.01); *B60N 2/806* (2018.02); *B60N 2/815* (2018.02); *B60N 2/865* (2018.02)

(58) Field of Classification Search
CPC ............ A47C 7/38; B60N 2/847; B60N 2/844; B60N 2/841; B60N 2/838; B60N 2/865
(Continued)

(56) References Cited

U.S. PATENT DOCUMENTS 4,265,482 A    5/1981  Nishimura et al. .......... 297/391
5,711,579 A    1/1998  Albrecht ....................... 297/410
(Continued)

FOREIGN PATENT DOCUMENTS

DE    3131597 A1 *  2/1983  ............. B60N 2/844
JP    S59-108457      7/1984
(Continued)

OTHER PUBLICATIONS

Japanese Patent and Trademark Office, Office Action—Japanese Patent Application No. 2016-547922, dated Aug. 1, 2017, 5 pages.
(Continued)

*Primary Examiner* — Milton Nelson, Jr.
(74) *Attorney, Agent, or Firm* — Sunstein Kann Murphy & Timbers LLP

(57) ABSTRACT

A headrest moving device, wherein a lever member, which is connected to the seat or the headrest in a pivoted state, presses the pawl, thereby releasing the engagement between the pawl and the ratchet. A consumer can release the locking at any position by operating a lever member externally protruded from the headrest after the consumer has moved the headrest. The method of releasing the locking can be easily recognized by the consumer, therefore the consumer can effectively and easily utilize the headrest moving device.

9 Claims, 19 Drawing Sheets

(51) Int. Cl.
    *B60N 2/841* (2018.01)
    *B60N 2/865* (2018.01)
    *B60N 2/815* (2018.01)

(58) Field of Classification Search
    USPC .................................................. 297/408, 370
    See application file for complete search history.

(56) References Cited

U.S. PATENT DOCUMENTS

| | | | |
|---|---|---|---|
| 6,068,337 A | 5/2000 | De Filippo | 297/391 |
| 6,302,485 B1 | 10/2001 | Nakane et al. | 297/408 |
| 6,880,890 B1 | 4/2005 | DeBrabant | 297/408 |
| 6,910,740 B2 | 6/2005 | Baker et al. | 297/408 |
| 7,267,407 B1 | 9/2007 | Demick et al. | 297/410 |
| 7,306,287 B2 | 12/2007 | Linardi et al. | 297/410 |
| 7,322,646 B2 | 1/2008 | Jammalamadaka et al. | 297/216.12 |
| 7,455,363 B2 | 11/2008 | Chung | 297/407 |
| 7,621,598 B2 | 11/2009 | Humer et al. | 297/410 |
| 7,669,932 B1 | 3/2010 | Grönninger et al. | 297/408 |
| 7,690,729 B2 | 4/2010 | Liao | 297/408 |
| 7,717,516 B2 | 5/2010 | Sutter, Jr. et al. | 297/403 |
| 7,758,126 B2 | 7/2010 | Haase | 297/408 |
| 8,002,356 B2 | 8/2011 | Lutzka et al. | 297/408 |
| 8,857,910 B2 | 10/2014 | Jeong | 297/408 |
| 8,979,203 B1 * | 3/2015 | Sutter, Jr. | B60N 2/847 297/408 |
| 9,126,513 B2 | 9/2015 | Jeong | 297/409 |
| 9,457,700 B2 | 10/2016 | Ishihara | |
| 2007/0164593 A1 * | 7/2007 | Brockman | B60N 2/847 297/408 |
| 2009/0152924 A1 | 6/2009 | Kim et al. | 297/408 |
| 2010/0327645 A1 | 12/2010 | Jeong | 297/408 |
| 2011/0089737 A1 | 4/2011 | Tscherbner et al. | 297/391 |
| 2011/0148171 A1 | 6/2011 | Charles et al. | 297/410 |
| 2011/0204686 A1 | 8/2011 | Lee et al. | 297/216.12 |
| 2011/0221250 A1 | 9/2011 | Little | 297/408 |
| 2012/0080926 A1 | 4/2012 | Fey et al. | 297/410 |
| 2012/0126605 A1 | 5/2012 | Gross et al. | 297/408 |
| 2014/0210245 A1 * | 7/2014 | Tobata | B60N 2/847 297/408 |
| 2015/0145310 A1 | 5/2015 | Jeong | |
| 2015/0375649 A1 | 12/2015 | Jeong | |

FOREIGN PATENT DOCUMENTS

| | | |
|---|---|---|
| JP | 2-13433 U | 1/1990 |
| JP | 5-58534 U | 8/1993 |
| JP | 2000-52825 A | 2/2000 |
| JP | 2000-83756 A | 3/2000 |
| JP | 2000-217659 A | 8/2000 |
| JP | 2001-61592 A | 3/2001 |
| JP | 2001-517968 A | 10/2001 |
| JP | 2006-523497 A | 10/2006 |
| JP | 2012-162123 A | 8/2012 |
| JP | 2013-244157 | 12/2013 |
| KR | 1998-052532 U | 10/1998 |
| KR | 2000-0015501 U | 8/2000 |
| KR | 10-0359761 B1 | 11/2002 |
| KR | 10-0403478 B1 | 10/2003 |
| KR | 10-0592788 B1 | 6/2006 |
| KR | 10-2007-0097302 A | 10/2007 |
| KR | 10-2007-0105210 A | 10/2007 |
| KR | 10-0790535 B1 | 1/2008 |
| KR | 10-2009-0065725 A | 6/2009 |
| KR | 2009-0091904 A | 8/2009 |
| KR | 10-0930033 B1 | 12/2009 |
| KR | 2010-0048410 A | 5/2010 |
| KR | 10-2010-0130000 A | 12/2010 |
| KR | 10-2011-0026180 A | 3/2011 |
| KR | 10-1071580 B1 | 10/2011 |
| KR | 10-1231013 B1 | 2/2013 |
| WO | WO 97/38874 A1 | 10/1997 |
| WO | WO 2010/112227 A1 | 10/2010 |
| WO | WO 2014/049723 | 4/2014 |

OTHER PUBLICATIONS

Japanese Patent and Trademark Office, Office Action—Japanese Patent Application No. 2016-547922, dated Aug. 1, 2017, 6 pages (English translation).

International Searching Authority, International Search Report—International Application No. PCT/KR2012/009937, dated Mar. 28, 2013, together with the Written Opinion of the International Searching Authority, 6 pages.

International Searching Authority, International Search Report—International Application No. PCT/KR2014/011775, dated Mar. 16, 2015, 2 pages.

Korean Intellectual Property Office, Office Action: Notification of Grounds for Rejection—Application No. 10-2013-0152809, dated Sep. 10, 2015, 3 pages.

Korean Intellectual Property Office, English translation: Office Action: Notification of Grounds for Rejection—Application No. 10-2013-0152809, dated Sep. 10, 2015, 3 pages.

The State Intellectual Property Office of the People's Republic of China, Notification of the First Office Action—Application No. 201380002493.6, dated May 26, 2015, 7 pages.

The State Intellectual Property Office of the People's Republic of China, English Translation: Notification of the First Office Action, Application No. 201380002493.6, dated May 26, 2015, 9 pages.

* cited by examiner

HEADREST MOVING DEVICE

This application is the national phase entry of international patent application no. PCT/KR2015/005248 filed May 26, 2015 and claims the benefit of Korean patent application No. 10-2014-0087410, filed Jul. 11, 2014, the disclosures of which are incorporated herein by reference in their entirety.

TECHNICAL FIELD

The present invention relates to a headrest moving device, and more particularly, to a headrest moving device wherein engagement between the pawl and the ratchet is disengaged by pressing the pawl with the lever member being connected to a seat or a headrest in a pivoted state.

BACKGROUND ART

According to the headrest moving device of the prior art, a headrest moving device having a tilting structure or a sliding structure has been suggested for discretionally adjusting the space between the headrest and the passenger's occipital region so that the headrest is being slanted at a certain angle by rotating the headrest around the fixed point thereof while the headrest is being fixed to the seat back.

The position of the headrest is adjusted by forming a plurality of teeth along the lengthwise direction when using a headrest having a sliding structure or a tilting structure as suggested in Korea Patent No. 0790535, Korea Utility Patent Publication No. 2000-0015501, Korea Patent No. 0403478, Korea Patent Publication No. 2007-0105210, and U.S. Patent Publication No. 2011-0221250. There has been limitation of using smaller teeth for fine adjustment of the position of the headrest since there is a problem that the teeth are easily damaged due to degradation of the durability of the teeth. Besides, there is a problem that the operation is disabled when some of the teeth are broken off. Moreover, there has been frequent instances when the headrest moving device is not being used even the headrest moving device is mounted in the vehicle not knowing how to disengage the locking of the headrest after the customer has moved the position of the headrest since the locking is disengaged only when the headrest is moved to the rearmost end.

In order to solve such a problem, a method for disengaging the locking at any position by providing a button which is connected to the slidingly moving shaft at the exterior of the headrest is disclosed in Korea Patent Publication No. 2010-0130000. However, when such a sliding shaft is provided, problems occur such as degradation of functionality and durability of the button, noise generation, and the like due to the friction between the button and the shaft.

In addition, a headrest provided with a solenoid valve for disengaging the locking is disclosed in Korea Patent No. 1071580. When the locking is disengaged by providing a solenoid valve, not only the manufacturing cost is increased but also the structure becomes complicated due to the wire connections and the like.

LEADING TECHNICAL LITERATURE

Patent Literature

[Patent Literature 1] Korea Patent No. 0790535
[Patent Literature 2] Korea Utility Patent Publication No. 2000-0015501
[Patent Literature 3] Korea Patent No. 0403478
[Patent Literature 4] Korea Patent Publication No. 2007-0105210
[Patent Literature 5] U.S. Patent Publication No. 2011-0221250
[Patent Literature 6] Korea Patent Publication No. 2010-0130000
[Patent Literature 7] Korea Patent No. 1071580

DISCLOSURE OF INVENTION

Technical Problem

The present invention has been made to solve the above problems, and an object of the present invention is to provide a headrest moving device which enables disengaging of the locking at any position by operating a lever member externally protruded from the headrest after a consumer has moved the headrest so that a way of disengaging the locking can be easily recognized by the consumer, thus, the consumer can effectively and easily utilize the headrest moving device; and the increase in the manufacturing cost is prevented at the same time; the structure thereof can be maintained in a simple form; and the functionality is enhanced while the noise generation and the degradation of the durability are minimized by minimizing the friction.

Solution to Problem

A headrest moving device of the present invention which has been made to solve the above problems is characterized in that and includes: a ratchet; a pawl which is engaged with said ratchet; and a lever member for disengaging the engagement between said pawl and said ratchet by pressing said pawl, wherein one of said pawl and said ratchet is connected to the seat, and the other is connected to the headrest, and said lever member is connected to said seat or said headrest in a pivoted state.

Said lever member, which is installed in a portion where said ratchet is installed, further includes: a first bracket which is installed in a horizontal rod which is connected to said seat; and a second bracket which is connected to said horizontal rod and said headrest in a pivoted state, wherein said pawl is connected to said first bracket in a pivoted state; and said ratchet is installed in said second bracket; a spring, whose both ends are being connected to said first bracket and said pawl respectively, is provided for maintaining the engagement state between said pawl and said ratchet; a stopping protrusion is protrudedly formed towards the inward width direction in said pawl; and said lever member is installed in said second bracket. Said lever member includes: a hinge segment which is disposed along the forward-backward direction and installed in said second bracket in a pivoted state; a handle unit which is protrudedly formed on the one side of the peripheral surface of said hinge segment; and a pressing unit which presses said stopping protrusion by being protrudedly formed on the other side of the peripheral surface of said hinge segment, wherein a long hole is formed along the up-down direction in said handle unit; a pin which is being inserted into said long hole is installed along the width direction in said second bracket; a lever return spring for returning of said lever member is provided; and said lever return spring is provided as a coil spring and may be inserted into the peripheral surface of said hinge segment.

A headrest moving device of the present invention further includes: a first link which is connected to said seat; a second link which is installed in the one side of said first link in a pivoted state; a third link which is installed in the other side of said first link in a pivoted state; and a fourth link whose one side is connected to said second link in a pivoted state, and the other side is connected to said third link in a pivoted state, wherein the headrest is connected to said fourth link; said pawl is connected to said first link; said ratchet is connected to said second link; a stopping protrusion is protrudedly formed in said pawl; and said lever member is installed in said second link. Said lever member is disposed along the forward-backward direction and includes: a hinge segment which is installed in said second link in a pivoted state; a handle unit which is protrudedly formed on the one side of the peripheral surface of said hinge segment; and a pressing unit which presses said stopping protrusion by being protrudedly formed on the other side of the peripheral surface of said hinge segment, wherein a lever return spring for returning of said lever member is provided; and said lever return spring is provided as a coil spring and being inserted into the peripheral surface of said hinge segment, and a supporting protrusion unit for supporting the both ends of said lever return spring is protrudedly formed at both sides of said hinge segment Unlike the previous description, a stopping protrusion is protrudedly formed in said pawl; and said lever member is installed outside of said second link, wherein said lever member includes: a hinge segment which is disposed along the forward-backward direction and installed in said second link in a pivoted state; a handle unit which is protrudedly formed on the one side of the peripheral surface of said hinge segment; and a pressing unit which presses said stopping protrusion by being protrudedly formed on the other side of the peripheral surface of said hinge segment, wherein a lever return spring for returning of said lever member may be provided.

A plurality of teeth are formed along the width direction and the length direction in said pawl and said ratchet, and a plurality of teeth in width direction and a plurality of teeth in length direction are engaged with each other when said pawl and said ratchet are engaged with each other. At least one of said pawl and said ratchet is formed by coupling of many plates formed with a plurality of teeth along the length direction, thus, the teeth may be formed along the width direction.

Advantageous Effects of Invention

According to a headrest moving device of the present invention, there are advantageous effects as follows. The lever member, which is connected to said seat or said headrest in a pivoted state, presses the pawl so that the engagement between the pawl and the ratchet is disengaged, thus, after the consumer has moved the headrest, disengaging of the locking is possible at any position by operating the lever member which is exposed outside of the headrest. Therefore, a way of disengaging the locking can be easily recognized by the consumer, thus, the consumer can effectively and easily utilize the headrest moving device. And, at the same time the increase in the manufacturing cost is prevented, and the structure thereof can be maintained in a simple form, and the functionality can be enhanced while the noise generation and the degradation of the durability can be minimized by minimizing the friction.

A headrest moving device of the present invention further includes: a first bracket which is installed in a horizontal rod being connected to said seat; a second bracket which is installed in said horizontal rod in a pivoted state and being connected to said headrest, wherein said pawl is installed in said first bracket in a pivoted state, and said ratchet is installed in said second bracket, and a spring, whose both ends are being connected to said first bracket and said pawl respectively, is provided for maintaining the engagement state between said pawl and said ratchet, thus the position can be adjusted by minutely tilting the headrest along the forward-backward direction.

A stopping protrusion is protrudedly formed towards the inward width direction in said pawl; and said lever member is installed in said second bracket, wherein said lever member includes: a hinge segment which is disposed along the forward-backward direction and installed in said second bracket in a pivoted state; a handle unit which is protrudedly formed on the one side of the peripheral surface of said hinge segment; and a pressing unit which presses said stopping protrusion by being protrudedly formed on the other side of the peripheral surface of said hinge segment, wherein a long hole is formed along the up-down direction in said handle unit; a pin which is being inserted into said long hole is installed along the width direction in said second bracket; a lever return spring for returning of said lever member is provided; and said lever return spring is provided as a coil spring and may be inserted into the peripheral surface of said hinge segment, so that the structure can be more simplified and at the same time a smoother pivotal movement of said lever member is facilitated, and furthermore, a more compact device size can be maintained by disposing said lever member inside said second bracket.

A headrest moving device of the present invention further includes: a first link which is connected to said seat; a second link which is installed in the one side of said first link in a pivoted state; a third link which is installed in the other side of said first link in a pivoted state; and a fourth link whose one side is connected to said second link in a pivoted state, and the other side is connected to said third link in a pivoted state, wherein the headrest is connected to said fourth link; said pawl is connected to said first link; and said ratchet is connected to said second link, so that the position thereof can be adjusted by minutely sliding the headrest along the forward-backward direction.

A stopping protrusion is protrudedly formed in said pawl; and said lever member is installed in said second link, wherein said lever member includes: a hinge segment which is disposed along the forward-backward direction and installed in said second link in a pivoted state; a handle unit which is protrudedly formed on the one side of the peripheral surface of said hinge segment; and a pressing unit which presses said stopping protrusion by being protrudedly formed on the other side of the peripheral surface of said hinge segment, wherein a lever return spring for returning of said lever member is provided, and said lever return spring is provided as a coil spring and inserted into the peripheral surface of said hinge segment, a supporting protrusion unit for supporting the both ends of said lever return spring is protrudedly formed at both sides of said hinge segment, so that the structure can be more simplified and at the same time the installation of the lever return spring can be facilitated.

When a first gear and a second gear wherein a plurality of teeth are formed along the width direction and the length direction, since a plurality of teeth in the width direction and in the length direction are engaged with each other, the teeth can endure high weight load even though the teeth are very minutely formed (a plurality of minute gears in the length direction and the width direction are coupled in multiple numbers), therefore the position of the headrest can be more minutely adjusted, thereby enabling the multi-position adjustment thereof. For example, although the headrest of the prior art can be adjusted to about 3 positions, the present invention can minutely adjust the position of the headrest to more than 9 positions. In addition, since the teeth can be minutely formed, it is advantageous in that the device becomes compact in size and the operating feel is enhanced.

In addition, the durability thereof is excellent since it can be operated even some of the teeth are disengaged. At least one of said pawl and said ratchet is formed by coupling of many plates formed with a plurality of teeth along the length direction, thus, the teeth may be formed along the width direction, therefore assembling becomes simple since the positions of the plates may not be precisely maintained during assembling process thereof, and it is advantageous in that the maintaining cost is reduced since only the plate having damaged teeth needs to be replaced when some of the teeth are fallen off. In addition, the manufacturing process of the prior art is complicated since the finishing process should be added after the casting process or forging process of the gears. However, according to the present invention, it is advantageous in that the manufacturing process becomes simple since the plates can be manufactured using a press.

MODE FOR THE INVENTION

Figure 1:
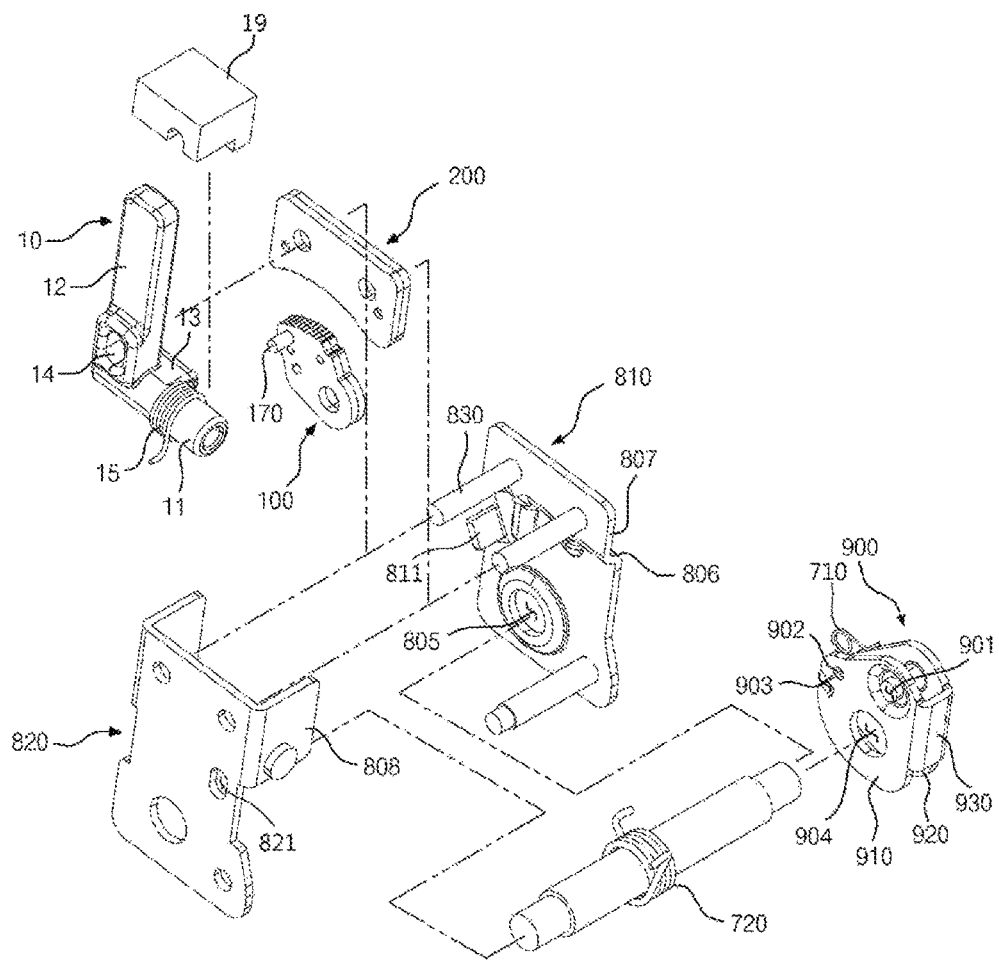
FIG. 1 is an exploded perspective view viewing from the backside of a headrest moving device according to the first exemplary embodiment of the present invention.
Figure 2:
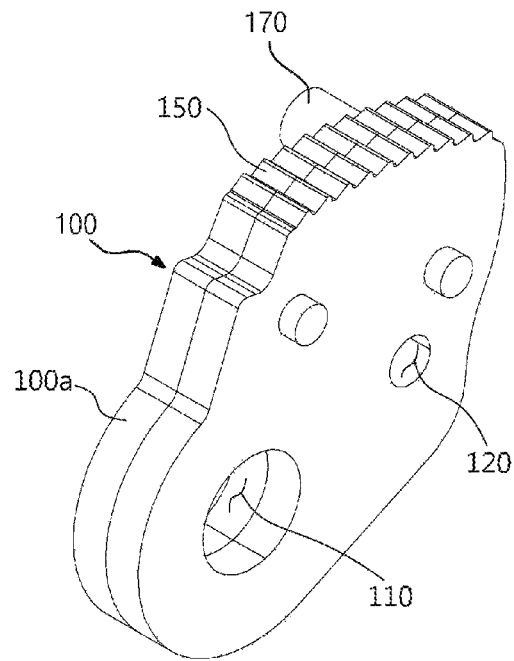
FIG. 2 is a perspective view of a pawl in FIG. 1.
Figure 3:
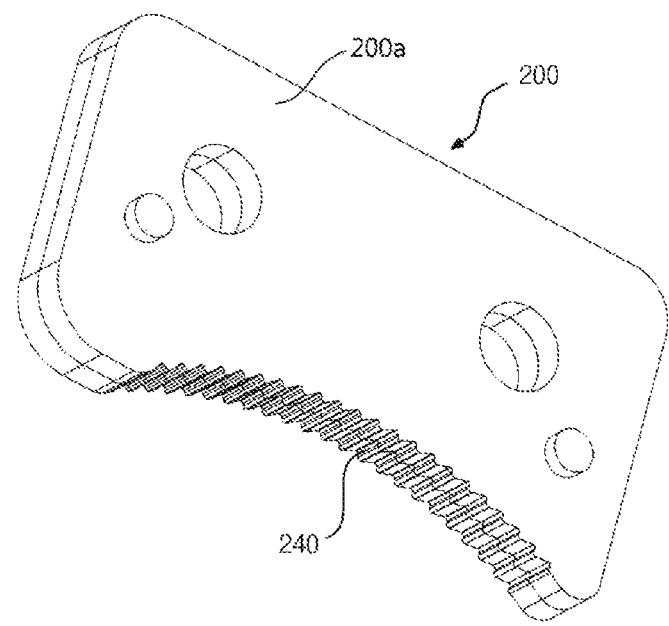
FIG. 3 is a perspective view of a ratchet in FIG. 1.
Figure 4:
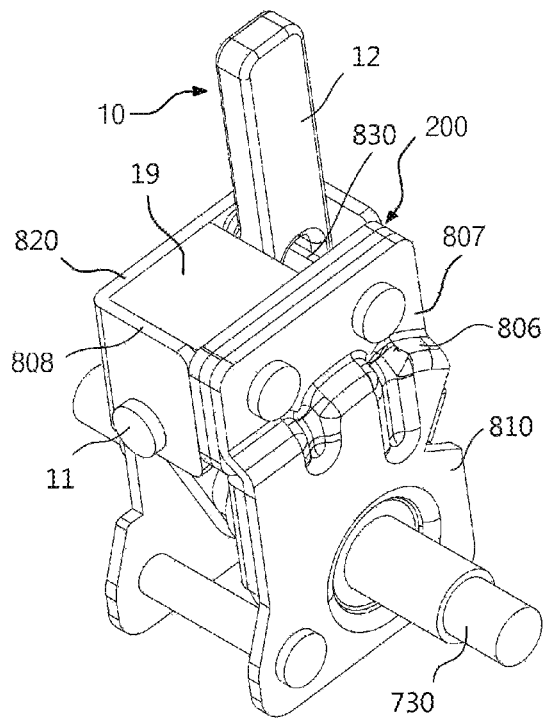
FIG. 4 is an assembled perspective view viewing from one side of the backside in FIG. 1.
Figure 5:
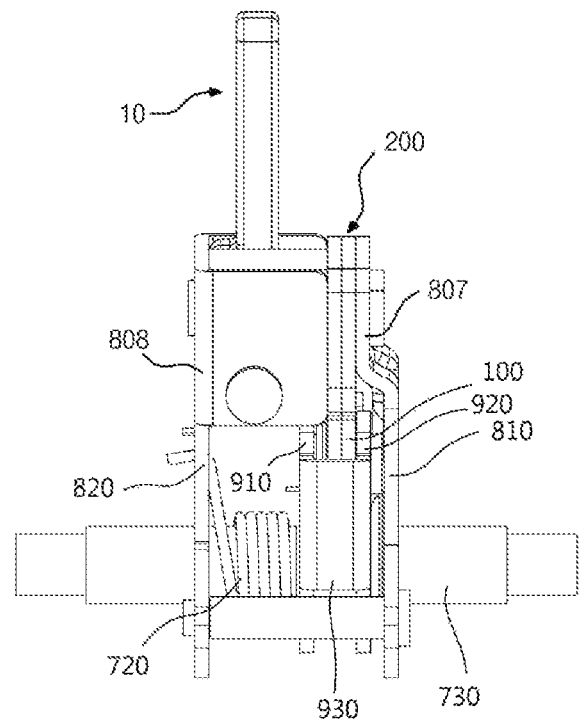
FIG. 5 is a rear view of FIG. 4.
Figure 6:
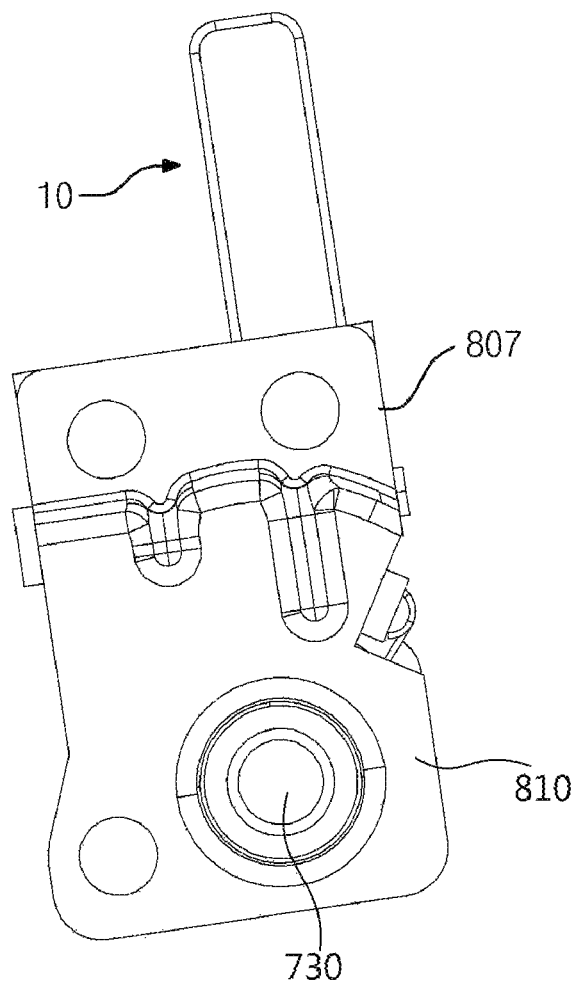
FIG. 6 is a side view of FIG. 4.
Figure 7:
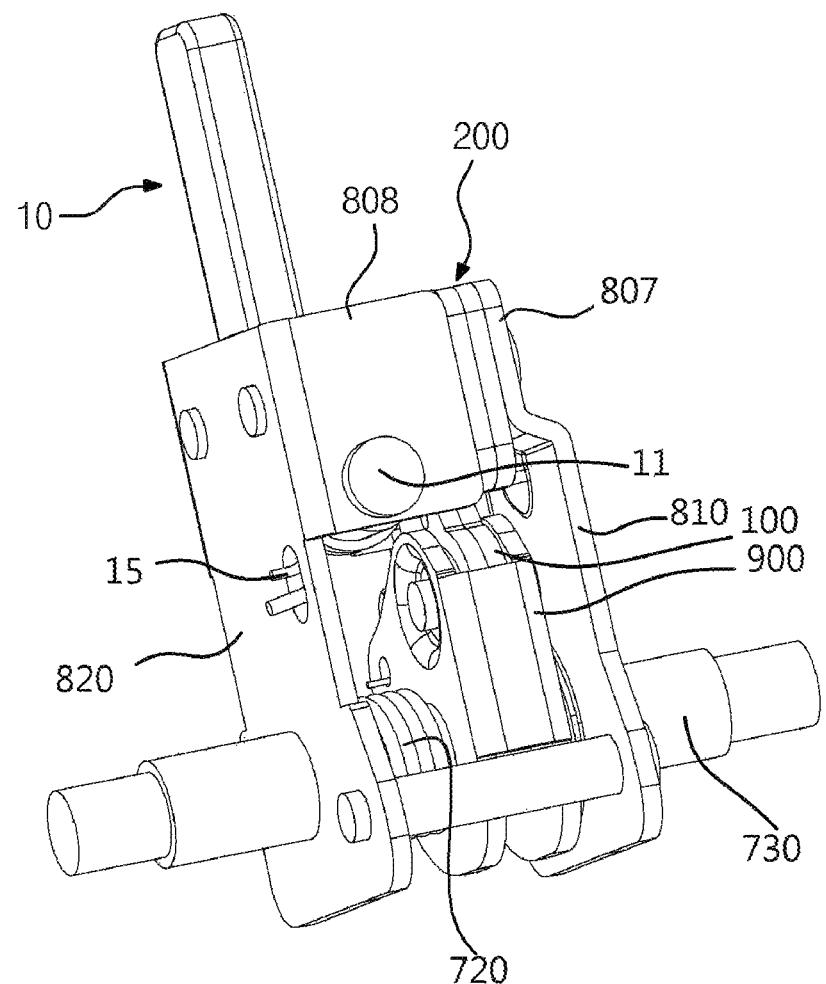
FIG. 7 is a perspective view viewing from the other side of the back of FIG. 4.
Figure 8:
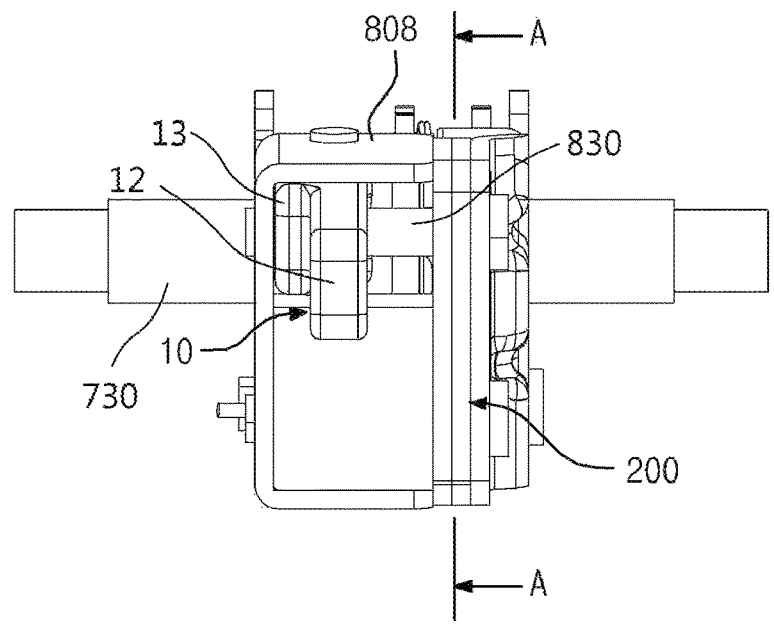
FIG. 8 is a plan view of FIG. 4.
Figure 9:
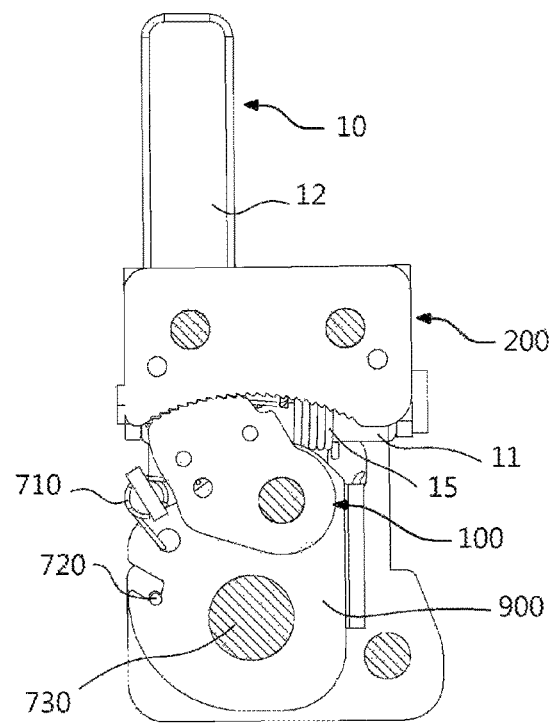
FIG. 9 is a cross-sectional view of FIG. 8 along the line A-A.

Hereinafter, a preferred exemplary embodiment of the present invention will be described in detail with reference to the accompanying drawings as follows.

For reference, components of the present invention which are the same as those of the prior art as described above will not be described separately while referring to the prior art described above.

Embodiment 1

As illustrated in FIGS. 1 to 10, a headrest moving device according to the exemplary embodiment of the present invention is characterized in that and includes: a ratchet 200; a pawl 100 which is engaged with said ratchet 200; and a lever member 10 for disengaging the engagement between said pawl 100 and said ratchet 200 by pressing said pawl 100, wherein one of said pawl 100 and said ratchet 200 is connected to the seat, and the other one is connected to the headrest, and said lever member 10 is connected to said seat or said headrest in a pivoted state.

The pawl 100 is vertically disposed along the forward-backward direction and formed to be a plate-like shape, and a plurality of teeth 150 is formed on the upper portion thereof along the width direction and the length direction.

The pawl 100 is formed by widthwise coupling of many plates 100*a* formed with a plurality of teeth 240 along the length direction, thus, a plurality of teeth 150 are formed along the width direction.

A coupling hole 110 is penetratedly formed along the width direction in the lower portion of the rear direction of the pawl 100.

A spring insertion hole 120 is formed in the lower portion of the pawl 100 so that it is disposed in front of the coupling hole 110.

A stopping protrusion 170 is protrudedly formed towards the inward width direction in the pawl 100.

The ratchet 200 is vertically disposed along the forward-backward direction and formed to be a plate-like shape, and a plurality of teeth 240 are formed on the lower portion thereof along the width direction and the length direction.

The teeth 150 and 240 of the pawl 100 and the ratchet 200 are formed in a way that the unidirectional movements in one direction (forward direction) are allowed while the opposite directional movements (backward direction) are prohibited.

The ratchet 200 is formed by widthwise coupling of many plates 200a formed with a plurality of teeth 240 along the length direction, thus, a plurality of teeth 240 are formed along the width direction.

The teeth 240 being formed along the length direction is formed in accordance with a circular arc.

The ratchet 200 is formed by coupling of many plates 200a, and at the same time coupling holes are formed therein for fixing the ratchet 200 to the second bracket 800, which will be described hereinafter.

The ratchet 200 is connected to the headrest as being fixedly installed in the second bracket 800.

A headrest moving device of the present invention further includes: a first bracket 900 being installed in the horizontal rod 730 of the stay rod which is connected to said seat; and a second bracket 800 being in a pivoted state installed in said horizontal rod 730 which is connected to said headrest.

The first bracket 900 includes: sidewalls 910 and 920 which are vertically disposed along the forward-backward direction; and a rear surface 930 which connects the rear ends of the side walls 910 and 920.

A pawl connecting hole 901 is formed along the width direction in the upper portion of the sidewalls 910 and 920. A shaft penetrating the pawl 100 is installed in the pawl connecting hole 901 so that the pawl 100 is installed in a pivoted state in the first bracket 900.

A through-hole 904, through which said horizontal rod 720 is penetrating, is formed in the lower portion of the sidewalls 910 and 920 so that the first bracket 900 is fixed to said horizontal rod 720. Thus, the first bracket 900 is being connected to the seat.

The first bracket 900 is disposed at the left side of the main spring 720 which is being inserted in the middle of said horizontal rod 730.

A spring insertion hole 902, into which the other end of the spring 710 is inserted, is formed in the front upper portion of the side wall 910 which is disposed at the right side.

In addition, a main spring insertion hole 903, into which one end of the main spring 720 is being inserted, is formed in the front lower portion of the sidewall 910.

The second bracket 800 includes sidewalls 810 and 820 which are vertically disposed along the forward-backward direction and disposed at both sides respectively.

A through-hole 805, through which said horizontal rod 730 is penetrating, is formed in the lower portion of the sidewalls 810 and 820 so that the second bracket 800 can be pivotally moved around the horizontal rod 730, the first bracket 900, and the pawl 100.

A spring insertion hole 821, into which the other end of the spring 720 is inserted, is elongatedly formed along the vertical direction in the side wall 820 which is disposed at the right side.

A first bended portion 806 inwardly bended from the center area, and a second bended portion 807 upwardly bended from the upper end of the first bended portion 806, are formed in the sidewall 810 which is disposed at the left side.

A curved portion 804 which has a wave-like curvature is formed in the center area of the sidewall 810 and the first bended portion 806 so that the durability is enhanced.

In the second bended portion 807, coupling holes 803 (not shown) are formed in the front side and the back side respectively along the width direction. A pin 830 in inserted into the coupling hole 803 so that a ratchet 200 can be installed and at the same time both of the sidewalls 810 and 820 are coupled together. Thus, the ratchet 200 is fixedly installed in the second bracket 800.

Meanwhile, a spacing block 19 is inserted into the pin 830 which is disposed in the back side so that the gap between the both sidewalls 810 and 820 can be stably maintained.

A third bended portion 808 is formed in the sidewall 810 which is disposed in the left side and having inwardly bended protruded portions formed by extending the front end and the rear end of the sidewall 810.

Through-holes are formed along the forward-backward direction in the third bended portion 808.

Owing to the third bended portion 808, a lever member 10, which is described hereinafter, can be stably installed in the second bracket 800.

A stopping protruded portion 811 is formed in the sidewall 810 which is disposed in the right side.

A spring 710, whose both ends are connected to the first bracket 900 and the pawl 100 respectively, is provided for maintaining the state of engagement between the pawl 100 and the ratchet 200.

The both ends of the spring 710 are inserted (connected) into the spring insertion holes 120 and 902 of the pawl 100 and the first bracket 900 respectively.

The lever member 10 disengages the engagement between the pawl 100 and the ratchet 200 by pressing the pawl 100.

The lever member 10 is installed in the second bracket 800 which is described hereinafter. In this way, the lever member 10 is installed in a portion where the ratchet 200 is installed. Unlike the previous description, the lever member 10 may be installed in a portion where the pawl 100 is installed.

The lever member 10 includes: a hinge segment 11 which is disposed along the forward-backward direction and installed in the second bracket 800 in a pivoted state; a handle unit 12 which is protrudedly formed on the one side of the peripheral surface of said hinge segment 11; and a pressing unit 13 which presses said stopping protrusion 170 by being protrudedly formed on the other side of the peripheral surface of said hinge segment 11.

The hinge segment 11 is formed in a rod-like shape and inserted into the through-hole of the third bended portion 808.

The handle unit 12 is vertically formed in the front upper portion of the hinge segment 11.

A long hole 14 is formed along the up-down direction in said handle unit 12. The portion where the long hole 14 is formed is protruded towards the right side and formed to have thicker left and right portions compared to the other portions thereof.

The pin 830 disposed in the front side is inserted into the long hole 14 and penetrates the long hole 14. The lever member 10 can be smoothly rotated guided by the pin 830 and the long hole when the consumer moves the lever member 10 along the left-to-right direction. Furthermore, the excessive pressing of the lever member 10 is prevented.

The pressing unit 13 is formed in the left front side of the hinge segment 11 so as to form a right angle with the handle unit 12. The pressing unit 13 is disposed in the upper portion of the stopping protrusion 170.

Further, a lever return spring 15 is provided for returning the lever member 10.

The lever return spring 15 is provided as a coil spring and inserted into the peripheral surface of said hinge segment 11.

One end of the lever return spring 15 is inserted into the lever return spring insertion slot which is formed in the back side of the pressing unit 13, and the other end is inserted into the main spring insertion hole 821.

When assembling the headrest moving device, the ratchet 200 is disposed between the upper portion of the left sidewall 820 of the second bracket 800 and the upper portion of the right sidewall 810, and the lever member 10 is installed in the right sidewall 810, and the lever member 10 is inserted into the pin 830 which connects both sidewalls 810 and 820.

The pawl 100 is disposed between the upper portion of the left sidewall 920 and the upper portion of the right sidewall 910 of the first bracket 900.

In addition, the left sidewall 820 of the second bracket 800, the left sidewall 920 of the first bracket 900, the right sidewall 910 of the first bracket 900, and the right sidewall 810 of the second bracket 800 are sequentially inserted into the central portion of the horizontal rod 730 of the stay rod from the left side thereof.

Hereinafter, an operation of an exemplary embodiment of the present invention having foresaid configuration will be described.

When tilting the headrest forward, the user pushes the headrest towards the front direction, then the headrest (ratchet, second bracket) is being tilted towards the front direction with respect to the stay rod (pawl, first bracket) since the teeth 150 and 240 are formed in such a way that the forward movement of the ratchet 200 with respect to the pawl 100 is allowed. When the headrest is moved to the user's desired position, the force pushing towards the front direction is removed, then the pawl 100 and the ratchet 200 are being engaged with each other, and the state of the engagement is stably maintained by the spring 710, thereby fixing the position of the headrest.

Figure 10:
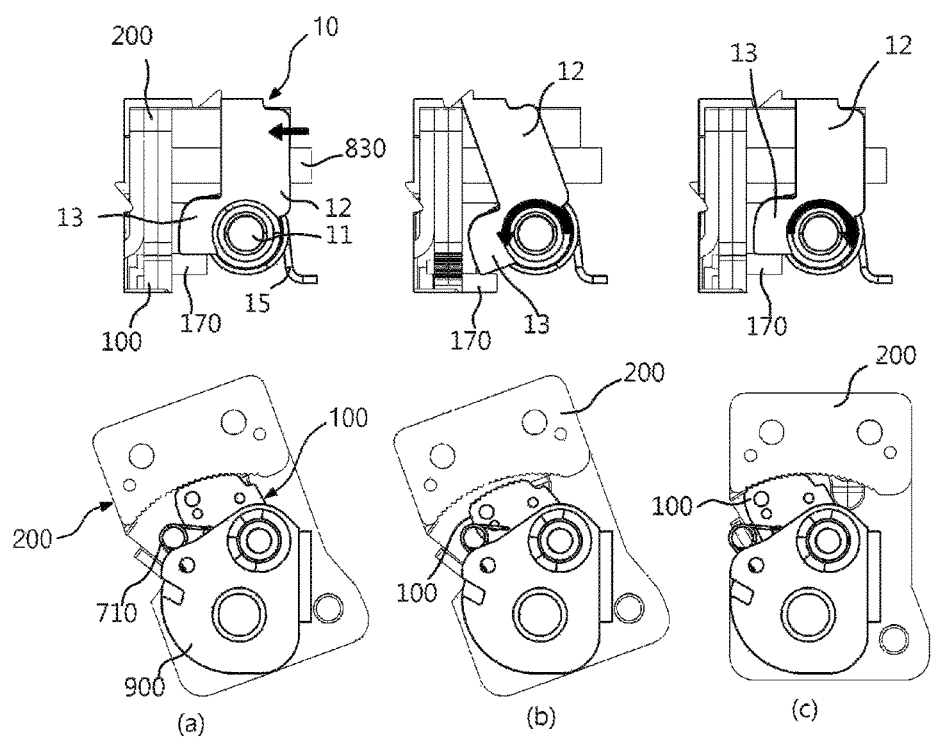
FIG. 10 is a state diagram illustrating the operational state in which the engagement between the pawl and the ratchet using a lever member of the headrest moving device according to the first exemplary embodiment of the present invention. (The upper portion of FIG. 10 is an exploded front view of the lever member section, and the lower portion is a side view including the pawl and the ratchet.)
Figure 11:
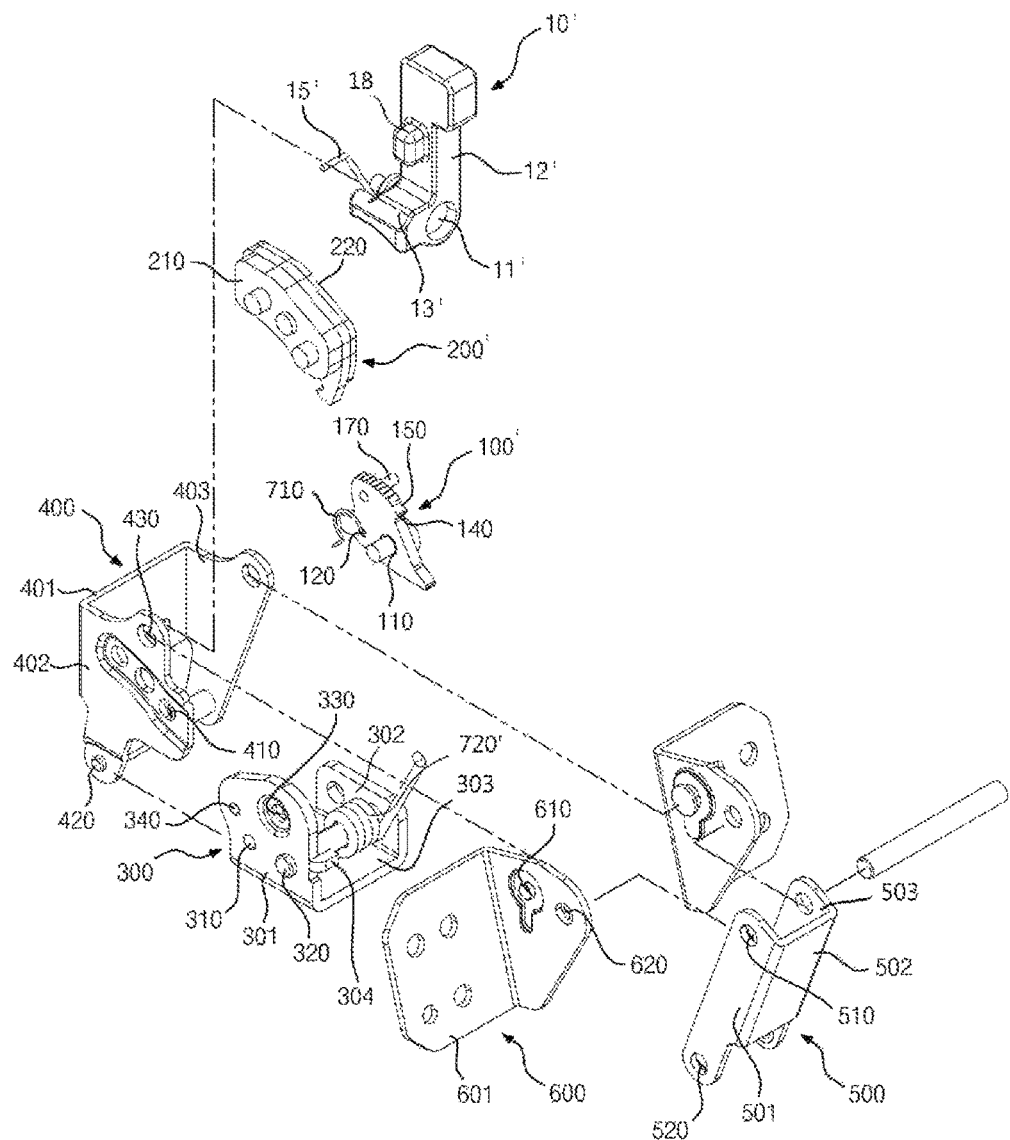
FIG. 11 is an exploded perspective view of a headrest moving device according to the second exemplary embodiment of the present invention.

When moving the headrest backward, as illustrated in FIG. 10, if the button (not shown), which is connected to the handle unit 12 of the lever member 10, or the handle unit 12 is being pushed as shown in (a), the lever member 10 rotates in a counter clockwise direction so that the stopping protrusion 170 is being pushed by the pressing unit 13 then the pawl 100 is being rotated in a counter clockwise direction, thereby disengaging the pawl 100 from the ratchet 200 as shown in (b). Thus, the headrest can be moved to anywhere along the forward-backward direction. When the user removes the force applied to the button or the handle unit 12, the lever member 10 is returned via a clockwise direction by the lever return spring 15 so that the pressing unit 13, which presses the stopping protrusion 170, is being returned to the original position as shown in (c). Consequently, the pawl 100 is being rotated in a clockwise direction and being engaged with the ratchet 200.

In such a way, after the consumer has moved the headrest, disengaging of the locking is possible at any position by operating a button connected to the lever member 10 being exposed outside of the headrest or the lever member 10. Therefore, a way of disengaging the locking can be easily recognized by the consumer, thus, the consumer can effectively and easily utilize the headrest moving device. And, at the same time the increase in the manufacturing cost is prevented, and the structure thereof can be maintained in a simple form, and the functionality can be enhanced while the noise generation and the degradation of the durability can be minimized by minimizing the friction.

Meanwhile, when the pawl 100 and the ratchet 200 are being engaged with each other, a plurality of teeth 150 and 240 along the width direction and a plurality of teeth 150 and 240 along the length direction are being engaged with each other.

In this way, even any one among the plurality of the teeth 150 and 240 along the width direction is being disengaged, the state of engagement is stably maintained since other teeth 150 and 240 in the line along the width direction are in a state of engagement. Besides, during engagement, the durability can be maintained even under high load conditions since a plurality of teeth 150 and 240 along the width direction and a plurality of teeth 150 and 240 along the length direction are simultaneously engaged.

Embodiment 2

Unlike the foresaid Embodiment 1, a headrest moving device according to the second exemplary embodiment, as illustrated in FIGS. 12 to 20, further includes: a first link 300 which is connected to said seat; a second link 400 which is installed in the one side of said first link 300 in a pivoted state; a third link 500 which is installed in the other side of said first link 300 in a pivoted state; and a fourth link 600 whose one end is installed in said second link 400 in a pivoted state, and the other end is installed in said third link 500 in a pivoted state, wherein the headrest is connected to said fourth link 600; said pawl 100' is connected to said first link 300; and said ratchet 200' is connected to said second link 400.

Detailed descriptions and illustrations are omitted for the same configurations as the foresaid embodiment.

A stopping protrusion 170 is protrudedly formed towards the inward width direction in said pawl 100'.

Figure 12:
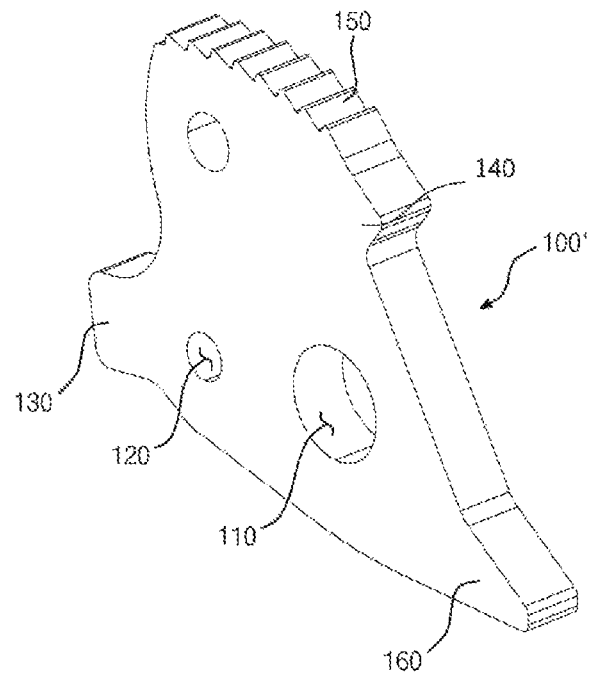
FIG. 12 is a perspective view of a pawl in FIG. 11.

As illustrated in FIG. 12, a first protruded portion 130 is formed in the lower front side of the pawl 100'.

In the upper back side of the pawl 100', a first holding threshold 140 is protrudedly formed toward the back so as to be disposed at the back side of the teeth 150.

In addition, a second protruded portion 160 is protrudedly formed toward the back in the lower back side of the pawl 100'. A stopper 304 of the first link 300, which will be described hereinafter, is disposed in the lower side of the second protruded portion 160.

The ratchet 200' is installed in the second link 400, which will be described hereinafter, and connected to the headrest.

Figure 13:
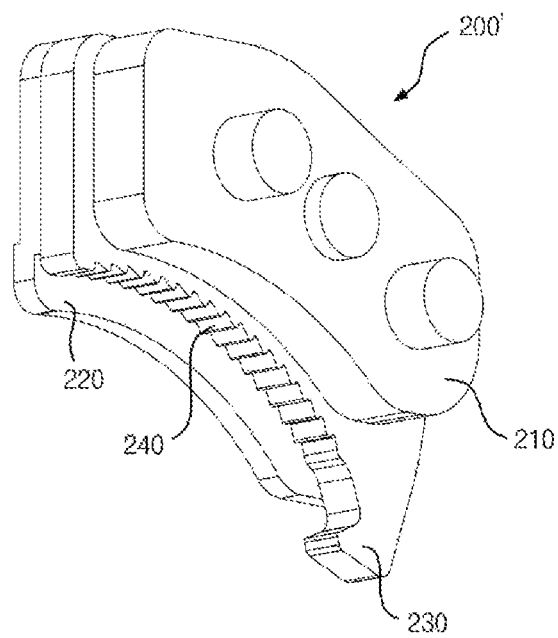
FIG. 13 is a perspective view of a ratchet in FIG. 11.
Figure 14:
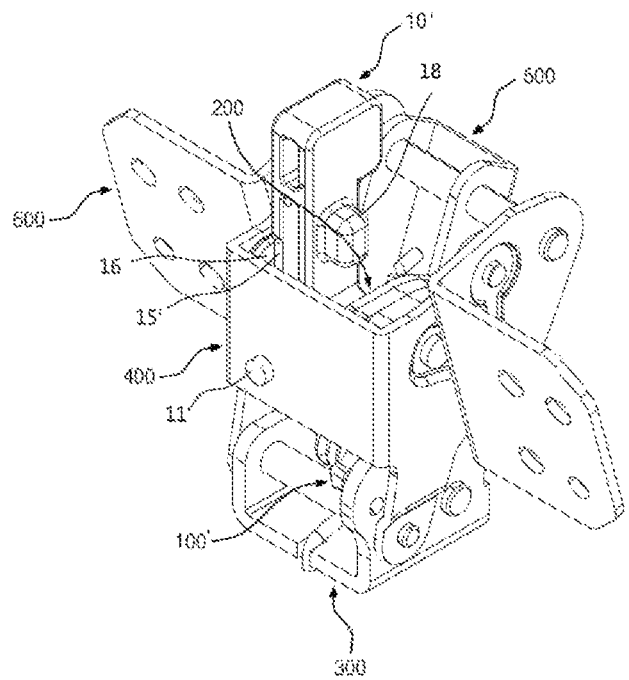
FIG. 14 is an assembled perspective view viewing from the front of FIG. 11.
Figure 15:
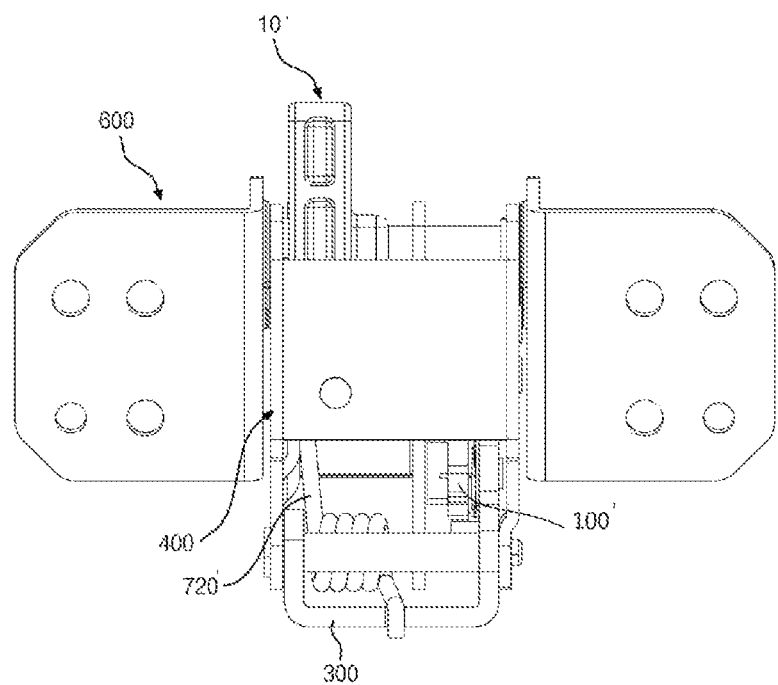
FIG. 15 is a front view of FIG. 14.
Figure 16:
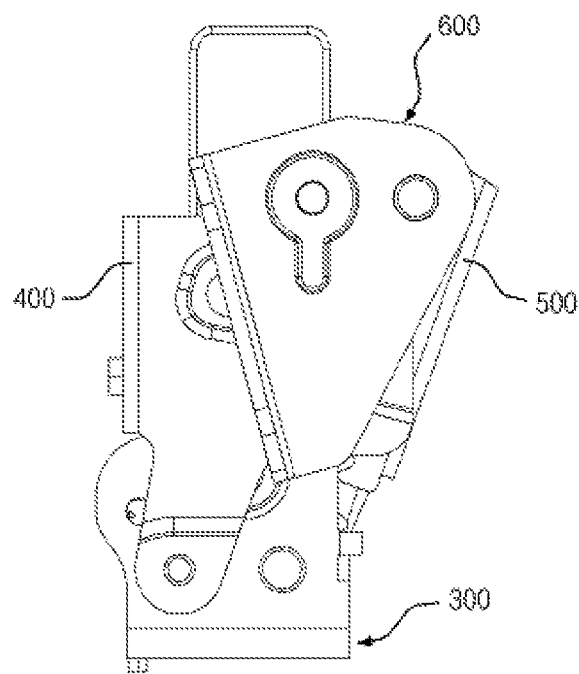
FIG. 16 is a side view of FIG. 14.
Figure 17:
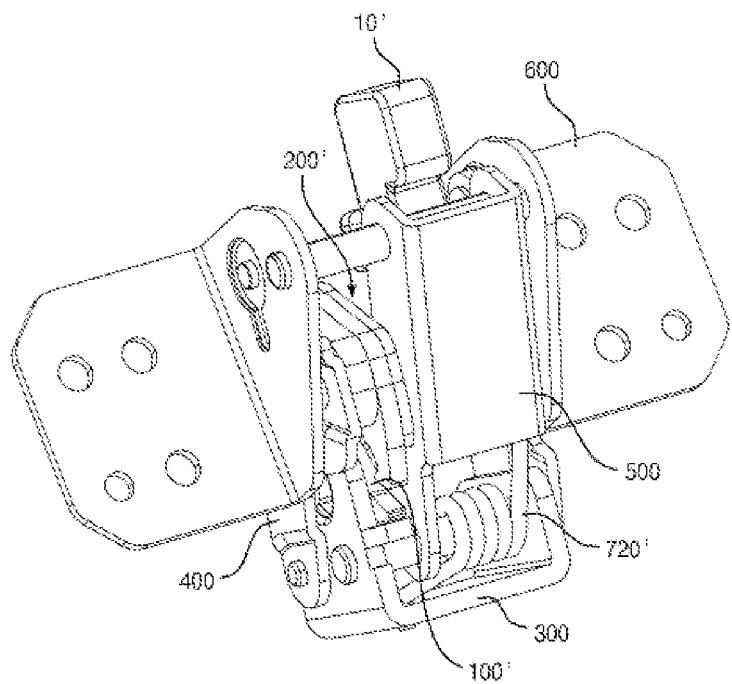
FIG. 17 is a perspective view viewing from the back of FIG. 14.
Figure 18:
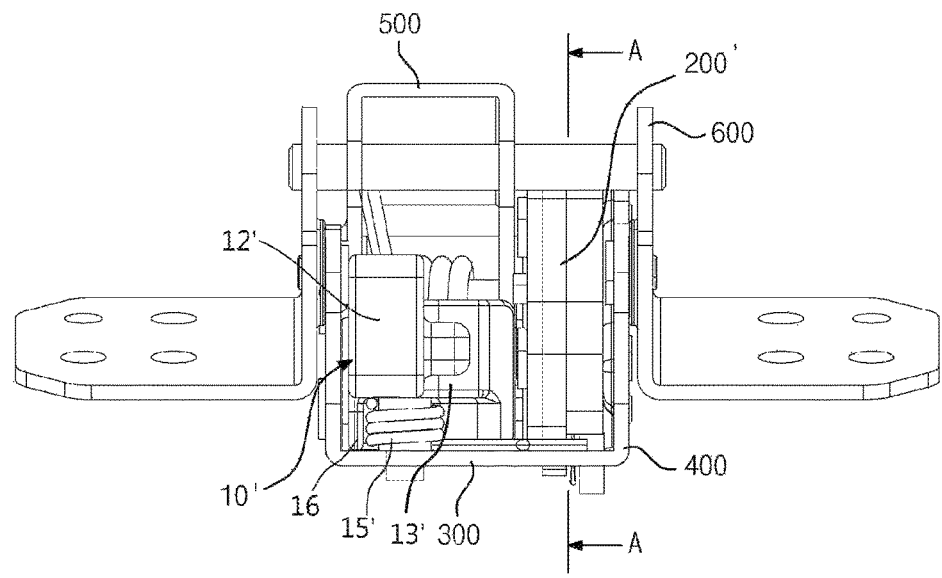
FIG. 18 is a plan view of FIG. 14.
Figure 19:
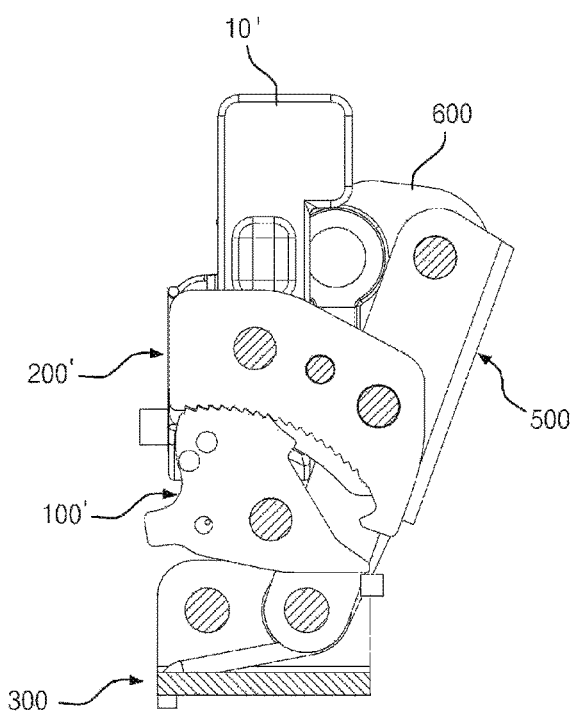
FIG. 19 is a cross-sectional view of FIG. 18 along the line A-A.

As illustrated in FIG. 13, a second holding threshold 230, which is held by the first holding threshold 140 of the pawl 100' in the back side of the ratchet 200', is protrudedly formed toward the front. The second holding threshold 230 is disposed in the lower back side of the teeth 240.

A guide plate 220 is installed in the left side of the ratchet 200', and an auxiliary plate 210 is installed in the right side thereof. Coupling holes are formed in the ratchet 200', the guide plate 220, and the auxiliary plate 210, and they are installed in the second link 400.

The guide plate 220 is protrudedly installed toward the lower portion than the plate 200a, and guides the pawl 100' which is engaged with the ratchet 200'.

The auxiliary plate 210 is disposed between the second link 400 and the ratchet 200', and adjusts the gap between the second link 400 and the ratchet 200'.

The first link 300 is installed in the center portion of the horizontal rod 730 of the stay rod which is being connected to said seat.

The first link 300 includes the sidewalls 301 and 302, which are vertically disposed in both sides of the first link 300, and a bottom surface 303 which is disposed above said horizontal rod 730 and connects the lower portions of the sidewalls 301 and 302.

The coupling holes 310 and 320 are penetratedly formed along the width direction in the side walls 301 and 302. The coupling holes 310 and 320 are disposed in the front side and the back side respectively.

In the side wall 301 which is disposed in the right side, a pawl coupling hole 330 is penetratedly formed along the width direction so as to be disposed above the coupling holes 310 and 320. The pawl 100' is in the first link 300 by inserting a shaft into the pawl coupling hole 330 and the coupling hole 110 of the pawl 100' in a pivoted state.

In the sidewall 301, a spring insertion hole 340 is formed so as to be disposed above the coupling holes 310 and 320, and in front of the pawl coupling hole 330.

In the back side of the sidewall 310, a stopper 304 is protrudedly formed toward the back so as to be disposed below the pawl coupling hole 330.

The second link 400 is installed in one side (front) of the first link 300 via the shaft in a pivoted state.

The second link 400 includes a front surface 401 and the sidewalls 402 and 403 formed in both side of the front surface 401.

The coupling holes 430 and 420 are formed in the upper portion and the lower portion of the sidewalls 402 and 403 respectively, and said shaft is being inserted into the coupling holes 430 and 420, so that the second link 400 is connected to the first link 300 and the second link 400 in a pivoted state. The coupling holes 430 and 420 are disposed diagonally such that the coupling hole 420 disposed in the lower portion is disposed in the front side.

In the sidewall 402 which is disposed in the right side, a plurality of ratchet coupling holes 410 are formed along the forward-backward direction so as to be disposed between the coupling holes 430 and 420. A groove is formed outside of the sidewall 402 for communicating with the ratchet coupling holes 410, and a portion of said sidewall 402 is inwardly curved so as to form said groove.

The ratchet 200' is fixedly installed in the second link 400 by inserting coupling members such as bolts and the like into the coupling holes and the ratchet coupling holes 410 which are formed in the ratchet 200'.

The third link 500 is installed in the other side (back side) of the first link 300 in a pivoted state.

The third link 500 includes a back surface 502, and the sidewalls 501 and 503 which are formed in both sides of the back surface 502.

A protruded plate 504 is formed in the lower front portion of the sidewall 501 which is disposed in the right side.

The coupling holes 510 and 520 are formed in the upper portion and the lower portion of the sidewalls 501 and 503.

The third link 500 is disposed at a slant so that the coupling hole 520, which is disposed in the lower portion of the sidewall 501, is disposed in the front side.

The third link 500 is connected to the first link 300 and the fourth link 600 in a pivoted state when the shaft is being inserted into the coupling holes 510 and 520.

One side (front side) of the fourth link 600 is connected to the second link 400 in a pivoted state, and the other side (back side) is connected to the third link 500 in a pivoted state.

The fourth link 600 is disposed in both sides of the device respectively.

The fourth link 600 includes a side plate 602 and an installation plate 601, which is formed by outwardly bending thereof, in front side of the side plate 602.

The headrest is installed in the installation plate 601.

The coupling holes 610 and 620 are formed in the front side and the back side of the side plate 602.

By inserting the shaft into the coupling holes 610 and 620, the front and the back of the fourth link 600 is installed in the second link 400 and the third link 600 respectively in a pivoted state.

The main spring 720' is installed by being inserted into the shaft which connects the first link 300 and the third link 500, and both ends thereof are connected to the first link 300 and the third link 500.

The lever member 10' is installed in the left side of the front surface 410 of the second link 400 in a pivoted state. The lever member 10' disposed inside of the second link 400.

Thus, the lever member 10' is disposed above the main spring 720'.

The lever member 10' includes: a hinge segment 11' which is disposed along the forward-backward direction and installed in said second link 400 in a pivoted state; a handle unit 12' which is protrudedly formed on the one side of the peripheral surface of said hinge segment 11; and a pressing unit 13' which presses said stopping protrusion 170 by being protrudedly formed on the other side of the peripheral surface of said hinge segment 11'.

The front side of the hinge segment 11' is installed in the front surface 401 in a pivoted state.

The handle unit 12' is formed in a bar-like shape, and vertically disposed along the up-down direction.

A protruded unit 18 is formed at the right side of the center area of the handle unit'. Owing to said protruded unit 18, an excessive movement of the lever member 10' is prevented.

The pressing unit 13' is protrudedly formed in the right side of the hinge segment 11', and disposed above the stopping protrusion 170.

The lever return spring 15' is provided as a coil spring and being inserted into the front peripheral surface of said hinge segment 11'.

A supporting protrusion unit 16 is protrudedly formed in the lever member 10' for supporting the both ends of said lever return spring 15' in the lower front area of the handle unit 12', and in the lower front area of the hinge segment 11', and in the lower front area of the pressing unit 13'. In such a way, the supporting protrusion unit 16 is formed in a plate-like shape, and formed in both sides of the hinge segment 11'. Owing to this, one end of the lever return spring 15' is connected to the lever member 10' and the other end is being bended and caught on the upper portion of the ratchet 200' and connected thereto.

Hereinafter, an operation of an exemplary embodiment of the present invention having the foresaid configuration will be described.

When sliding the headrest forward, the user pushes the headrest towards the front direction, then the headrest (ratchet, second to fourth links) is being d towards the front direction with respect to the stay rod (pawl, first link) since the teeth 150 and 240 are formed in such a way that the forward movement of the ratchet 200' with respect to the pawl 100 is allowed. When the headrest is moved to the user's desired position, the force pushing towards the front direction is removed, then the pawl 100' and the ratchet 200' are being engaged with each other, and the state of the engagement is stably maintained by the spring 710, thereby fixing the position of the headrest.

The position of the headrest along the forward-backward direction can be minutely adjusted (1 to 9 positions) by a plurality of teeth 150 and 240 along the length direction.

Figure 20:
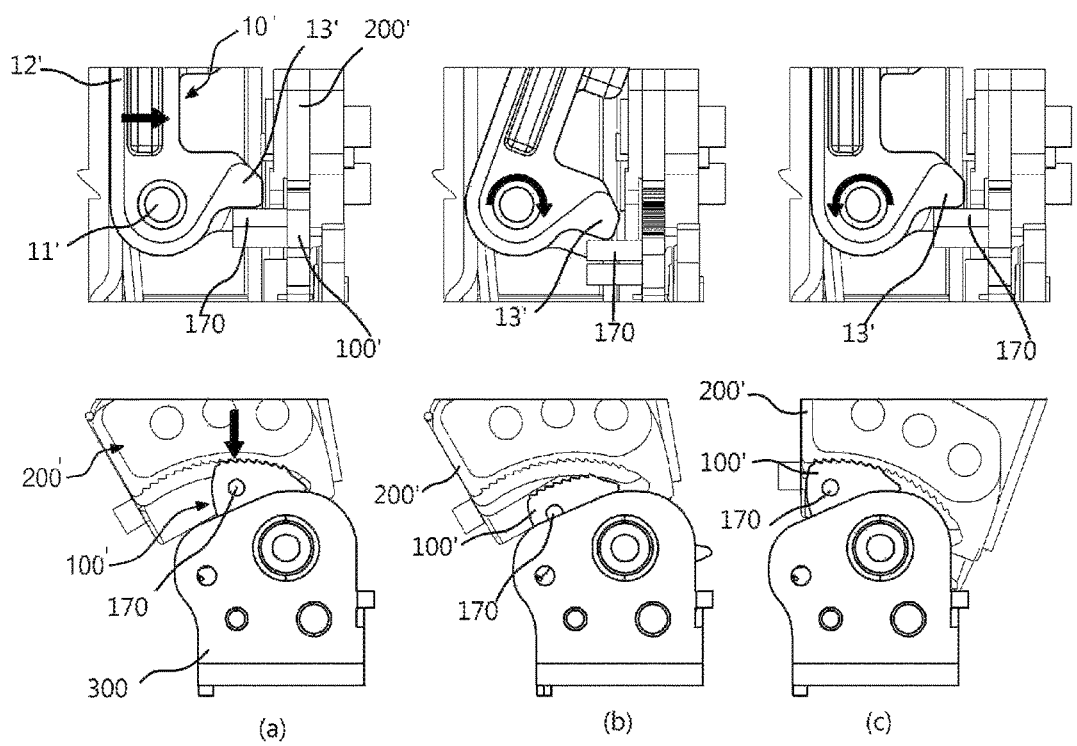
FIG. 20 is a state diagram illustrating the operational state in which the engagement between the pawl and the ratchet using a lever member of the headrest moving device according to the second exemplary embodiment of the present invention. (The upper portion of FIG. 20 is an exploded front view of the lever member section, and the lower portion is a side view including the pawl and the ratchet.)
Figure 21:
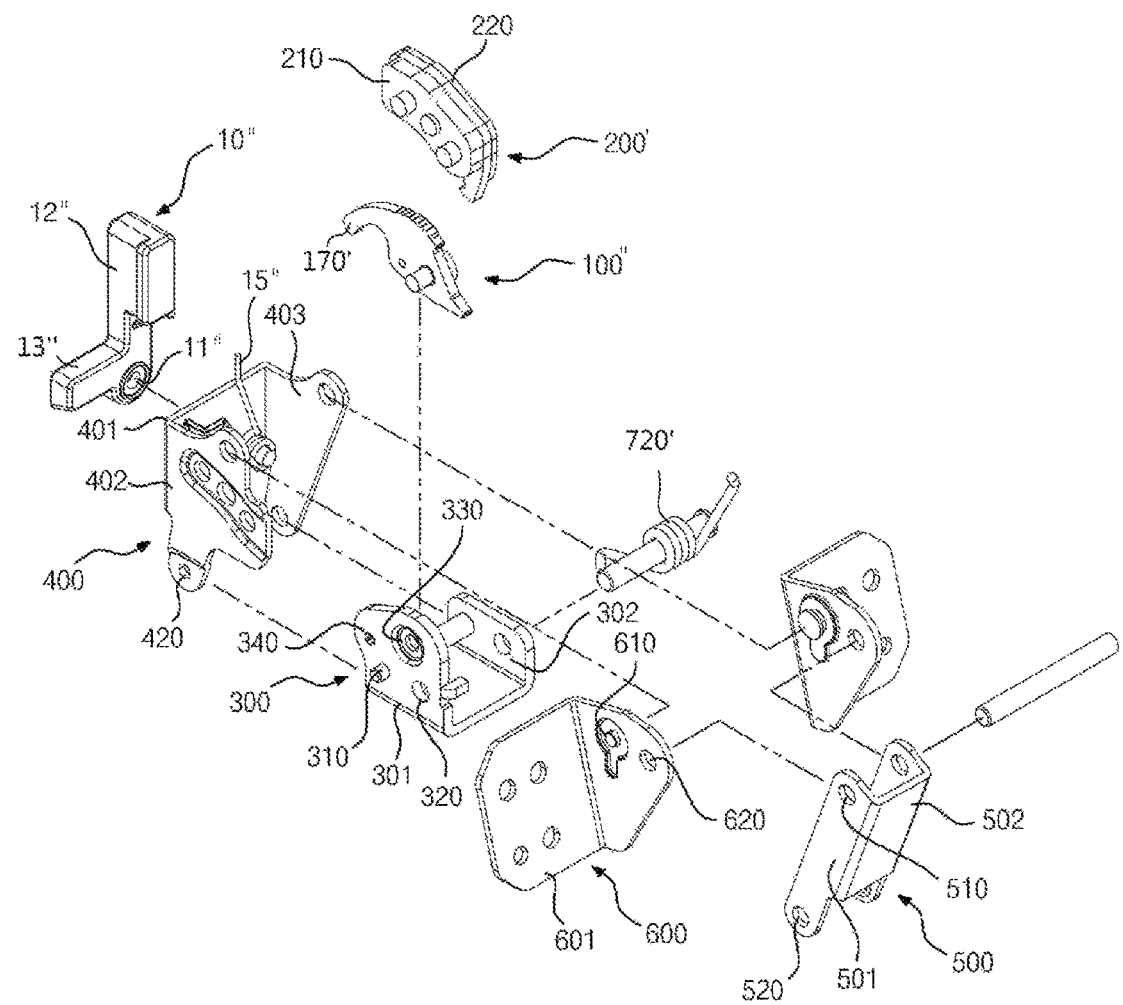
FIG. 21 is an exploded perspective view of another headrest moving device according to the second exemplary embodiment of the present invention.
Figure 22:
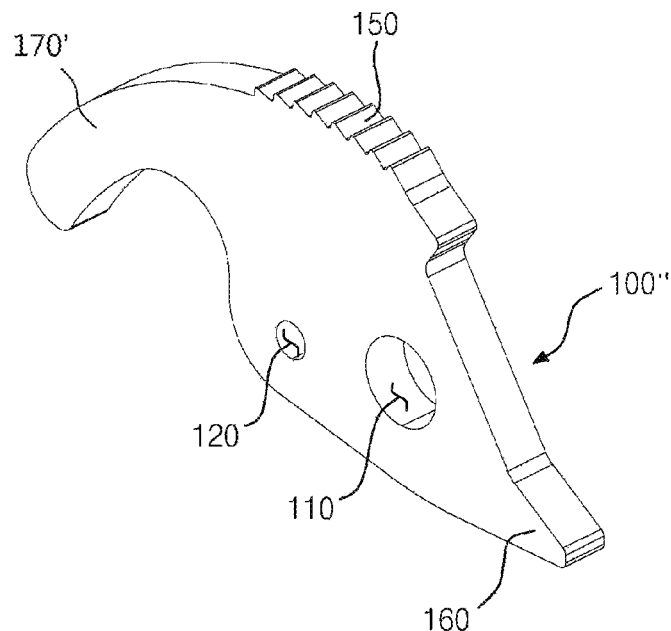
FIG. 22 is a perspective view of a pawl in FIG. 21.
Figure 23:
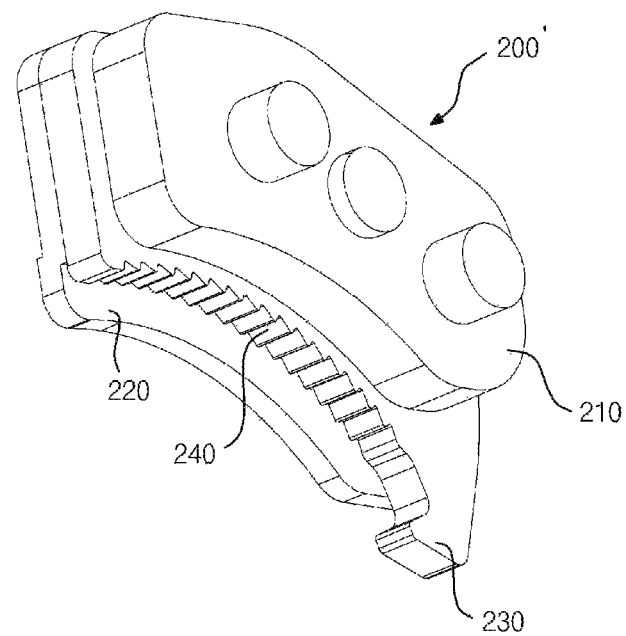
FIG. 23 is a perspective view of a ratchet in FIG. 21.
Figure 24:
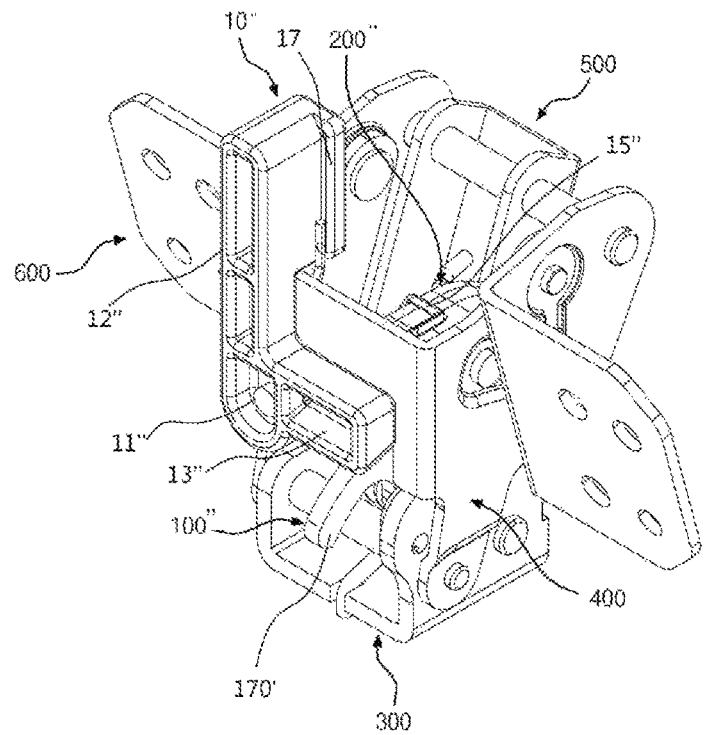
FIG. 24 is an assembled perspective view viewing from the front of FIG. 21.
Figure 25:
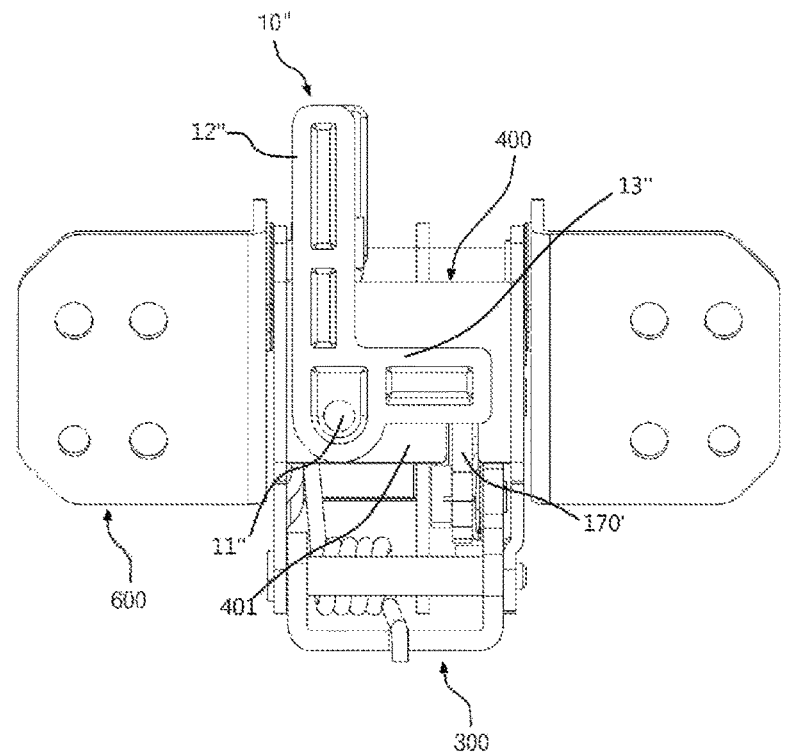
FIG. 25 is a front view of FIG. 24.
Figure 26:
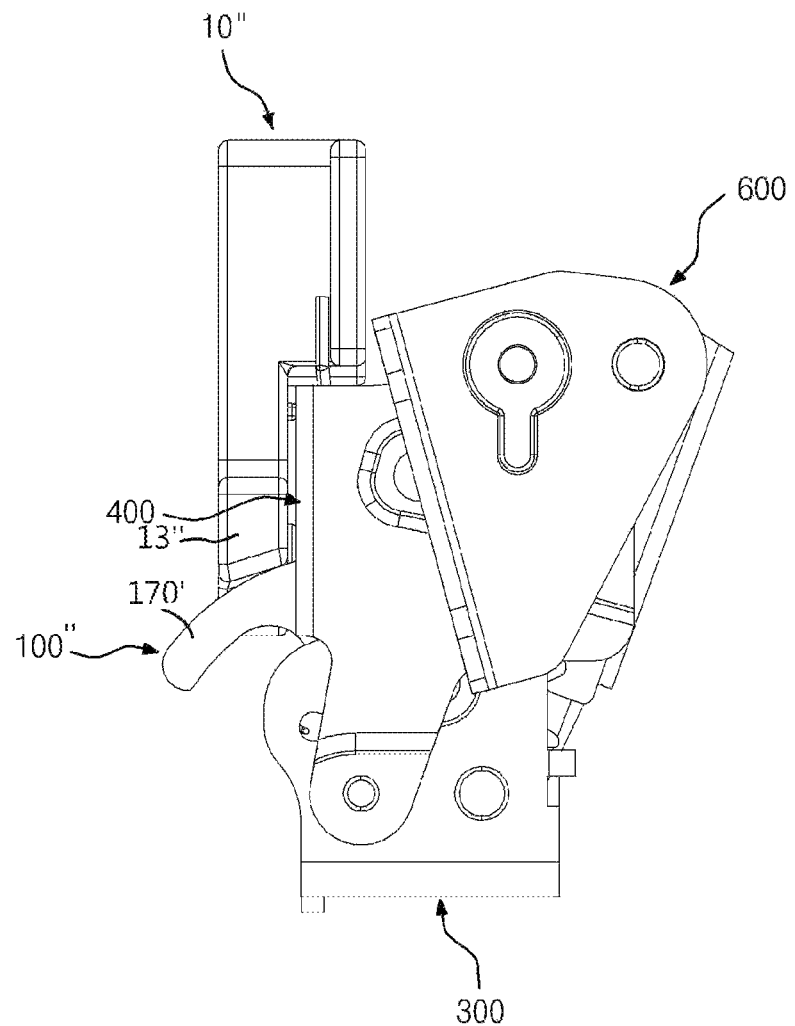
FIG. 26 is a side view of FIG. 24.
Figure 27:
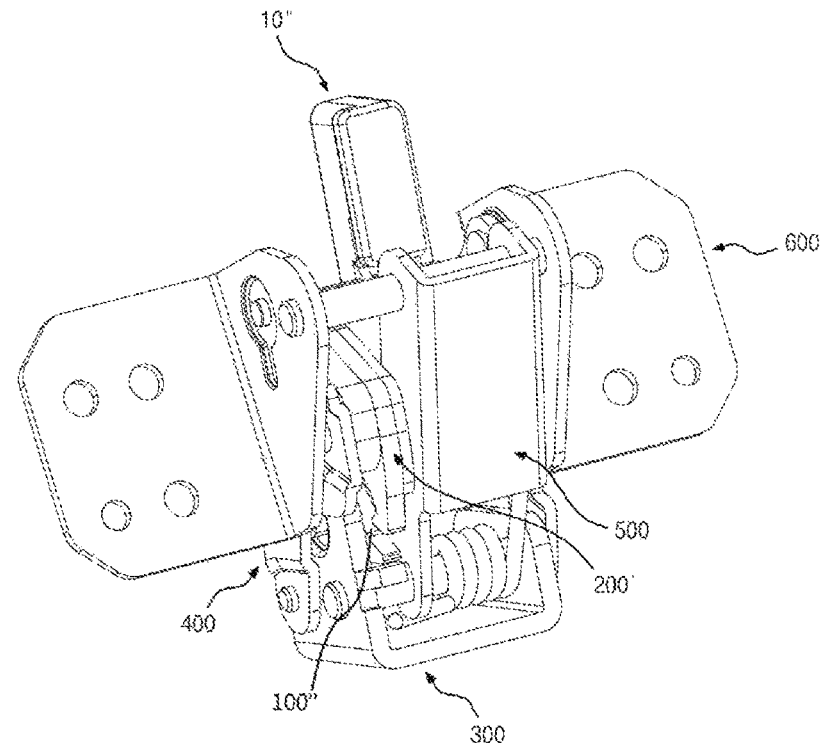
FIG. 27 is a perspective view viewing from the back of FIG. 24.
Figure 28:
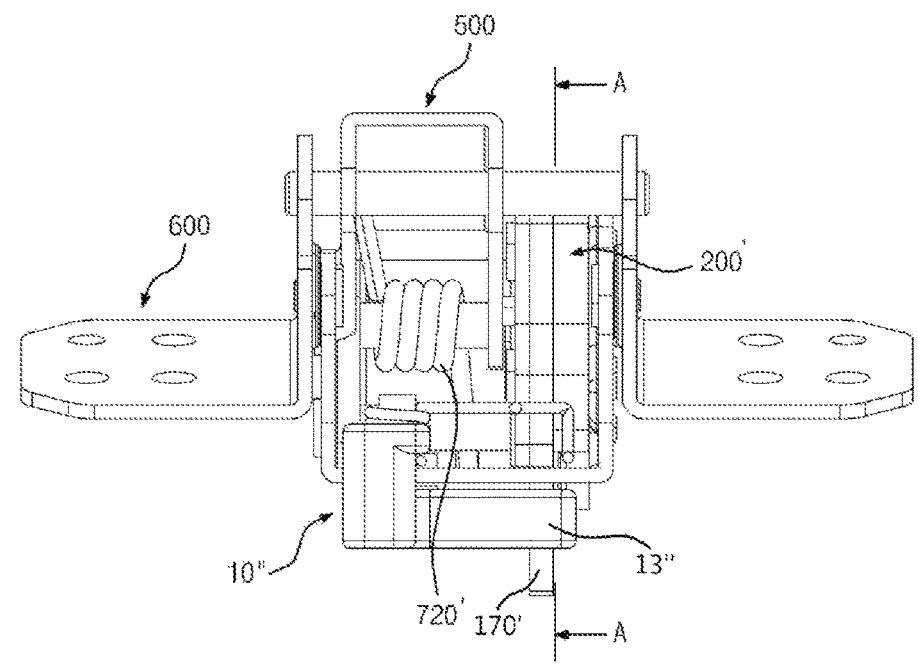
FIG. 28 is a plan view of FIG. 24.
Figure 29:
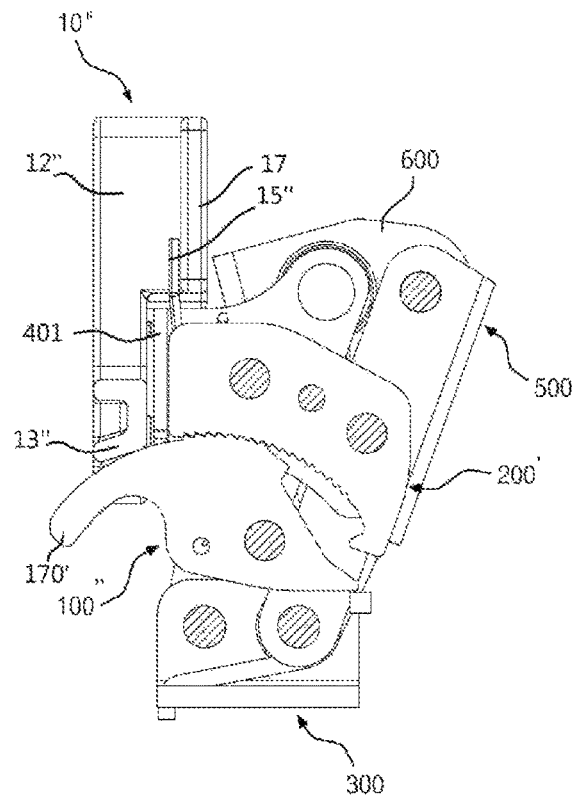
FIG. 29 is a cross-sectional view of FIG. 28 along the line A-A.

When moving the headrest backward, as illustrated in FIG. 20, if the button (not shown), which is connected to the handle unit 12' of the lever member 10', or the handle unit 12' is being pushed as shown in (a), the lever member 10' rotates in a clockwise direction so that the stopping protrusion 170 is being pushed by the pressing unit 13' then the pawl 100' is being rotated in a clockwise direction, thereby disengaging the pawl 100' from the ratchet 200' as shown in (b). When the user removes the force applied to the button or the handle unit 12', the lever member 10' is returned via a counter clockwise direction by the lever return spring 15' so that the pressing unit 13', which presses the stopping protrusion 170, is being returned to the original position as shown in (c). Consequently, the pawl 100' is being rotated in a counter clockwise direction and being engaged with the ratchet 200', thus locking is achieved.

Unlike the previous description, as illustrated in FIGS. 21 to 30, the lever member 10" is installed on the outside of the second link 400, and said lever member 10" may include: a hinge segment 11" which is disposed along the forward-backward direction and installed in the second link 400 in a pivoted state; a handle unit 12" which is protrudedly formed on the one side of the peripheral surface of said hinge segment 11"; and a pressing unit 13" which presses said stopping protrusion 170' by being protrudedly formed on the other side of the peripheral surface of said hinge segment 11".

Descriptions will be omitted for the same configurations as the foresaid embodiment.

The stopping protrusion 170' is formed on the front side of the pawl 100" so that it is more protruded than the front side of the second link 400. The stopping protrusion 170' is formed to be an arc-like shape which is downwardly bended with curvature. Since the stopping protrusion 170' is formed to have such a shape along the forward-backward direction, forming of the pawl 100" is more facilitated.

The hinge segment 11" is installed to penetrate the front surface 401.

A back side protrusion which is protruded toward the back is formed in the upper back side of the handle unit 12". Said back side protrusion is disposed above the front surface 401. Owing to the back side protrusion, when the lever member 10" is rotated more than a certain angle it is caught on the front surface 401 so that the excessive rotation is prevented.

The lever return spring 15" is inserted into the hinge segment 11" so as to be disposed in the back side of the front spring 401.

A spring supporting plate 17 which supports one end of the lever return spring 15" is protrudedly formed in the right side of said back side protrusion. The other end of lever return spring 15" is being bended and caught on the upper portion of the ratchet 200'.

The pressing unit 13" is disposed in front of the front surface 401, and in the lower right side of the handle unit 12".

The lower end of the pressing unit 13" is slanted in a way that the height of the lower end thereof is getting lower as it is approaching toward the front.

Hereinafter, an operation of an exemplary embodiment of the present invention having the foresaid configuration will be described.

Description about the sliding operation of the headrest toward the front will be omitted since it is same as described in the foresaid exemplary embodiment.

Figure 30:
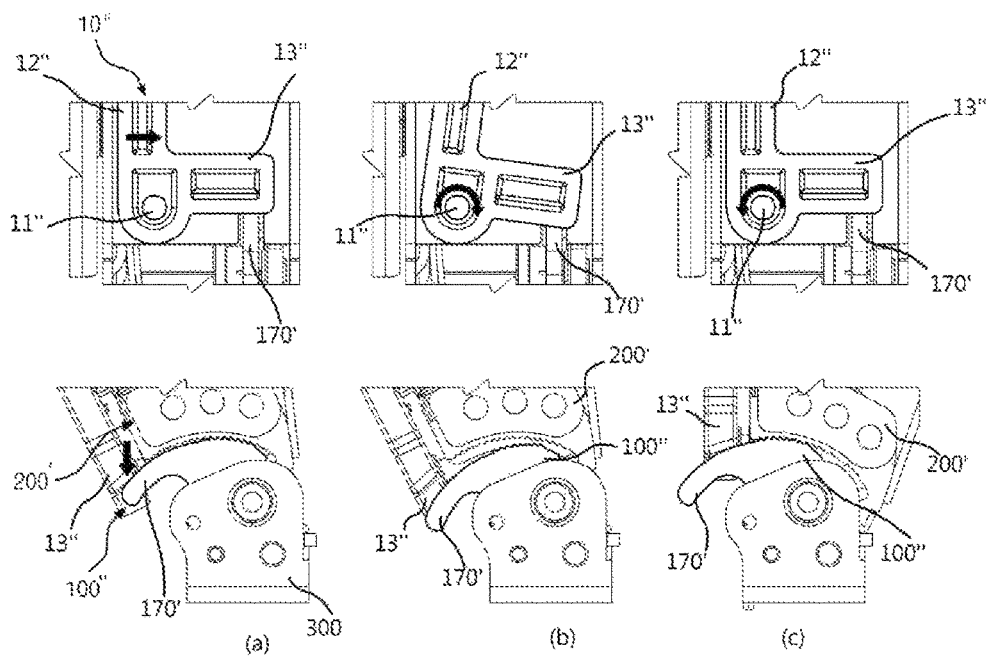
FIG. 30 is a state diagram illustrating the operational state in which the engagement between the pawl and the ratchet using a lever member of the headrest moving device in FIG. 21. (The upper portion of FIG. 30 is an exploded front view of the lever member section, and the lower portion is a side view including the pawl and the ratchet.)

When moving the headrest backward, as illustrated in FIG. 30, if the button (not shown), which is connected to the handle unit 12" of the lever member 10", or the handle unit 12" is being pushed as shown in (a), the lever member 10" rotates in a clockwise direction so that the stopping protrusion 170' is being pushed by the pressing unit 13", which is disposed in front of the second link 400, then the pawl 100" is being rotated in a clockwise direction, thereby disengaging the pawl 100" from the ratchet 200' as shown in (b). When the user removes the force applied to the button or the handle unit 12", the lever member 10" is returned via a counter clockwise direction by the lever return spring 15" so that the pressing unit 13", which presses the stopping protrusion 170', is being returned to the original position as shown in (c). Consequently, the pawl 100" is being rotated in a counter clockwise direction and being engaged with the ratchet 200', thus locking is achieved.

As described above, although it is described with reference to the preferred exemplary embodiment of the present invention, a person skilled in the art may modify or alternate in various ways within the spirit and the scope of the present invention as described in the accompanying claims.

| Description of Symbols | |
|---|---|
| 10: lever member | 11: hinge segment |
| 12: handle unit | 13: pressing unit |
| 100: pawl | 200: ratchet |
| 100a, 200a: plate | 150, 240: teeth |
| 710: spring | 720: main spring |
| 730: horizontal rod | |

The invention claimed is:

1. A headrest moving device for adjusting a headrest forward and backward relative to a seat, the headrest moving device comprising:
  a ratchet;
  a pawl which is engaged with said ratchet;
  a lever member for disengaging the engagement between said pawl and said ratchet by pressing said pawl, wherein one of said pawl and said ratchet for connection to the seat, and the other is for connection to the headrest, and said lever member connects to said seat or said headrest in a pivoted state;
  a first bracket which is installed in a horizontal rod which connects to said seat;
  a second bracket which connects to said horizontal rod and said headrest in a pivoted state, wherein said pawl is connected to said first bracket in a pivoted state and said ratchet is installed in said second bracket;
  a spring, whose both ends are connected to said first bracket and said pawl respectively, for maintaining the engagement state between said pawl and said ratchet; and
  a stopping protrusion protruding from said pawl and wherein said lever member is installed in said second bracket, wherein said lever member includes:
    a hinge segment which is disposed along the forward-backward direction and installed in said second bracket in a pivoted state;
    a handle unit which protrudes in an upward direction from one side of the peripheral surface of said hinge segment; and
    a pressing unit which presses said stopping protrusion by being protrudedly formed on an other side of the peripheral surface of said hinge segment, wherein
    a long hole is formed along the up-down direction in said handle unit;
    a pin which is being inserted into said long hole is installed along the width direction in said second bracket;
    a lever return spring for returning of said lever member is provided; and said lever return spring is provided as a coil spring and inserted into the peripheral surface of said hinge segment.

2. The headrest moving device according to claim 1, wherein
a plurality of teeth are formed along the width direction and the length direction in said pawl and said ratchet, and
a plurality of teeth in width direction and a plurality of teeth in length direction are engaged with each other when said pawl and said ratchet are engaged with each other.

3. The headrest moving device according to claim 2, wherein
at least one of said pawl and said ratchet is formed by coupling of many plates formed with a plurality of teeth along the length direction, thus, the teeth are formed along the width direction.

4. A headrest moving device for adjusting a headrest forward and backward relative to a seat, the headrest moving device comprising:
a ratchet;
a pawl which is engaged with said ratchet;
a lever member for disengaging the engagement between said pawl and said ratchet by pressing said pawl, wherein one of said pawl and said ratchet is for connection to the seat, and the other is for connection to the headrest, and said lever member connects to said seat or said headrest in a pivoted state;
a first link which connects to said seat;
a second link which is installed in one side of said first link in a pivoted state;
a third link which is installed in an other side of said first link in a pivoted state; and
a fourth link having one side connected to said second link in a pivoted state, and an other side connected to said third link in a pivoted state, wherein
the headrest is connected to said fourth link;
said pawl is connected to said first link; and
said ratchet is connected to said second link;
a stopping protrusion protrudedly formed in said pawl wherein said lever member is installed in said second link and is disposed along the forward-backward direction and includes:
a hinge segment which is installed in said second link in a pivoted state;
a handle unit which is protrudedly formed on one side of the peripheral surface of said hinge segment;
a pressing unit which presses said stopping protrusion by being protrudedly formed on an other side of the peripheral surface of said hinge segment; and
a lever return spring for returning of said lever member wherein said lever return spring is provided as a coil spring and being inserted into the peripheral surface of said hinge segment, and a supporting protrusion unit for supporting both ends of said lever return spring protrudedly formed at both sides of said hinge segment.

5. The headrest moving device according to claim 4, wherein
a plurality of teeth are formed along the width direction and the length direction in said pawl and said ratchet, and
a plurality of teeth in width direction and a plurality of teeth in length direction are engaged with each other when said pawl and said ratchet are engaged with each other.

6. The headrest moving device according to claim 5, wherein
at least one of said pawl and said ratchet is formed by coupling of many plates formed with a plurality of teeth along the length direction, thus, the teeth are formed along the width direction.

7. A headrest moving device for adjusting a headrest forward and backward relative to a seat, the headrest moving device comprising:
a ratchet;
a pawl which is engaged with said ratchet;
a lever member for disengaging the engagement between said pawl and said ratchet by pressing said pawl, wherein one of said pawl and said ratchet is for connection to the seat, and the other is for connection to the headrest, and said lever member connects to said seat or said headrest in a pivoted state;
a first link which connects to said seat;
a second link which is installed in one side of said first link in a pivoted state;
a third link which is installed in an other side of said first link in a pivoted state; and
a fourth link having one side connected to said second link in a pivoted state, and an other side connected to said third link in a pivoted state, wherein
the headrest is connected to said fourth link;
said pawl is connected to said first link; and
said ratchet is connected to said second link;
a stopping protrusion protrudedly formed in said pawl and wherein said lever member is installed outside of said second link, wherein
said lever member includes:
a hinge segment which is disposed along the forward-backward direction and installed in said second link in a pivoted state;
a handle unit which is protrudedly formed on one side of the peripheral surface of said hinge segment; and
a pressing unit which presses said stopping protrusion by being protrudedly formed on an other side of the peripheral surface of said hinge segment, wherein
a lever return spring for returning of said lever member is provided.

8. The headrest moving device according to claim 7, wherein
a plurality of teeth are formed along the width direction and the length direction in said pawl and said ratchet, and
a plurality of teeth in width direction and a plurality of teeth in length direction are engaged with each other when said pawl and said ratchet are engaged with each other.

9. The headrest moving device according to claim 8, wherein
at least one of said pawl and said ratchet is formed by coupling of many plates formed with a plurality of teeth along the length direction, thus, the teeth are formed along the width direction.

* * * * *